Aug. 25, 1925.
L. OFFERDAHL
1,551,324
SELF ALIGNING PISTON
Filed Oct. 2, 1922
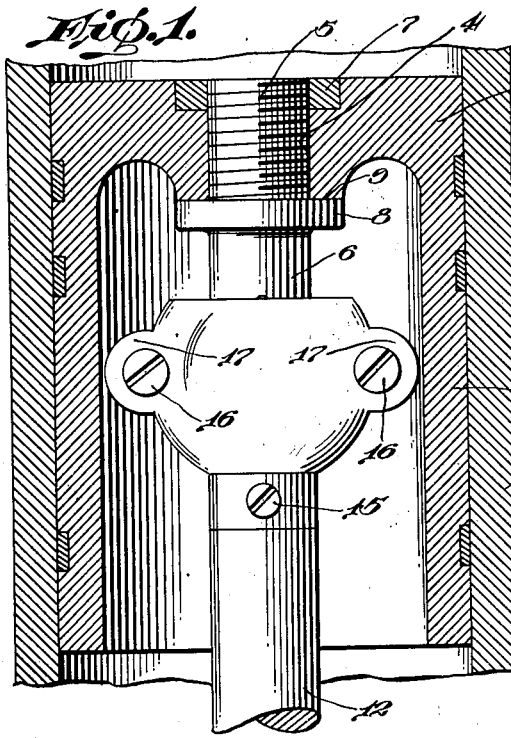
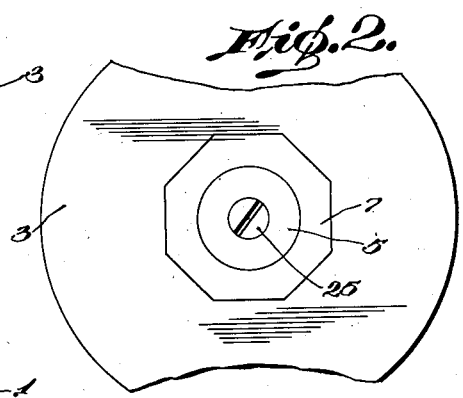
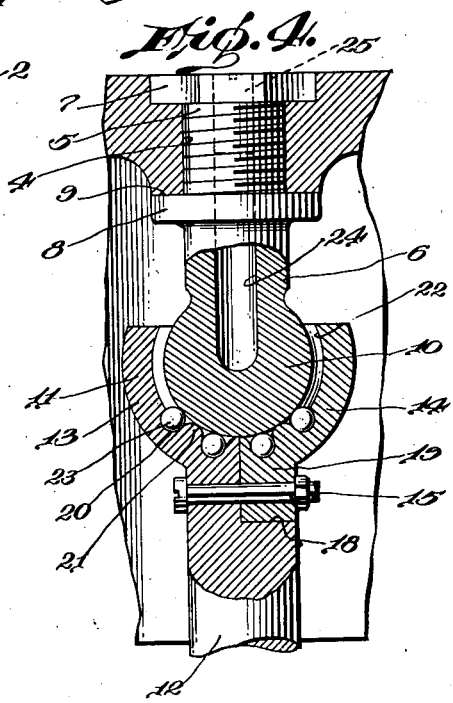
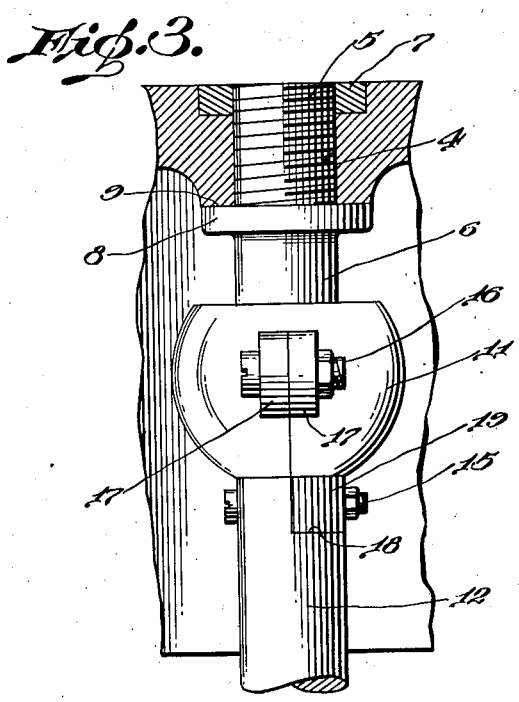
Lewis Offerdahl
INVENTOR
BY Victor J. Evans
ATTORNEY Patented Aug. 25, 1925.

1,551,324

UNITED STATES PATENT OFFICE.

LEWIS OFFERDAHL, OF CHICAGO, ILLINOIS.

SELF-ALIGNING PISTON.

Application filed October 2, 1922. Serial No. 591,912.

*To all whom it may concern:*

Be it known that I, LEWIS OFFERDAHL, a citizen of the United States, residing at Chicago, in the county of Cook and State of Illinois, have invented new and useful Improvements in Self-Aligning Pistons, of which the following is a specification.

This invention relates to a piston and connecting rod structure for use in internal combustion engines, and an object of the invention is to provide a piston and connecting rod structure which will eliminate the use of the transversely extending piston pin, in piston constructions of internal combustion engines, and which will also permit accurate perfect alignment of the piston within the cylinder preventing excessive wear on both the piston and cylinder and also eliminating inconvenience and inefficiency of the engine caused by failure of proper alignment of the piston and cylinder.

Other object of the invention will appear in the following detailed description taken in connection with the accompanying drawing wherein:

Fig. 1 is a vertical section through a piston showing the improved connecting rod associated therewith.

Fig. 2 is a fragmentary top plan of the piston.

Fig. 3 is a fragmentary section through the piston showing the piston rod in side elevation and connecting rod at right angles to Figure 1.

Fig. 4 is a longitudinal section through the rod.

Referring more particularly to the drawings, the piston 1 is reciprocable in the cylinder 2 and it is to be understood that the present type of piston and connecting rod may be used in any approved type of internal combustion engine.

In the present invention, the head 3 of the piston is relatively thick and is provided with a central threaded bore aligning with the longitudinal axis of the piston into which threaded bore 4 the upper threaded end 5 of the connecting rod section 6 is threaded. A polygonal nut 7 is countersunk into the head of the piston and an annular shoulder or collar 8 is formed upon the connecting rod section 6 and abuts the annular shoulder 9 for preventing longitudinal movement of the connecting rod relative to the piston.

The connecting rod 6 has a relatively large ball 10 formed upon its lower end which fits into the socket 11 carried by the upper end of the lower section 12 of the connecting rod. The socket 11 is illustrated as formed of the sections 13 formed integrally with the lower section 12 of the rod, while the socket section 14 is detachably connected to the rod section 12 and to the socket section 13 by means of bolts 15 and 16, which latter bolts extend through the ears 17 formed on the socket section. The rod section 12 is provided with a cut out portion 18 into which the projection 19 formed on the socket section 14 sits and the bolt 15 extends through the extension 19 and through the rod section 12, as clearly shown in Figure 4 of the drawings.

The socket sections 13 and 14 are provided with alternate bearing ball receiving races 20 and semi-spherical ribs or projections 21 which engage the ball 10 and they may also be provided with lubricant retaining grooves as indicated at 22 to permit thorough lubrication of the bearing surfaces of the ball 10 and the socket 11. The ball and socket construction is more specifically described and claimed in my companion application filed July 24, 1922, Serial No. 577,175.

When using the improved piston and connecting rod structure on high speed motors, it may be necessary to eliminate the bearing balls 23, which rest in the races 20, as the excessive heat created by the high speed operation of the motor might tend to crack the balls and also it may be desirable to drill out the section 6 of the connecting rod structure, as shown at 24, to provide an opening or air space therein to facilitate the cooling of this portion of the rod and when so constructed, a plug as indicated in dotted lines at 25 in Figure 4 is threaded into the end of the bore 24 where it opens out through the upper end of the section 6 forming a tight closure therefor.

From the foregoing description taken in connection with the accompanying drawings, it will be apparent that the piston will be permitted to align with the bore of the cylinder 2, irrespective of the aligning of the connection of the connecting rod with the crank shaft (not shown) as the ball and socket joint in the connecting rod will permit movement of the piston relative to the connecting rod and crank shaft in such manner as to permit it to travel perfectly in the bore of the cylinder and prevent scoring, excessive strains on the pin of the piston or the like providing a substantially self aligning piston.

It is, of course, to be understood that the invention may be constructed in other manners and the parts associated in different relations and, therefore, I do not desire to be limited in any manner except as set forth in the claims hereunto appended.

Having thus described my invention what I claim is:

1. The combination with the piston of an internal combustion engine, of a connecting rod comprising upper and lower sections, said upper section having a threaded portion threaded into the piston, the upper face of the piston being provided with a countersink and a removable nut on said threaded portion and normally resting in said countersink flush with the face of the piston.

2. A connecting rod for internal combustion engine pistons comprising a pair of rod sections, one of said sections being threaded for connection with the piston, a ball and socket joint connecting said sections, said socket provided with alternate ball races, and arcuate ribs, and bearing balls in said ball races.

3. The combination with the piston of an internal combustion engine, of a connecting rod having a threaded portion threaded into the piston at the longitudinal center of the piston head, said connecting rod comprising an upper section and a lower section, a ball and socket connection between said upper and lower sections to permit lateral movement of the piston relative to the lower section of the connecting rod, said socket provided with alternate ball races and semispherical ribs, and bearing balls in said ball races.

In testimony whereof I affix my signature.

LEWIS OFFERDAHL.